United States Patent
Stopczynski

(10) Patent No.: US 7,197,396 B2
(45) Date of Patent: Mar. 27, 2007

(54) COLLISION MITIGATION SYSTEM

(75) Inventor: Lawrence Stopczynski, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 10/813,726

(22) Filed: Mar. 31, 2004

(65) Prior Publication Data
US 2006/0173621 A1    Aug. 3, 2006

(51) Int. Cl.
*G06F 17/10* (2006.01)
*B60R 2/20* (2006.01)

(52) U.S. Cl. ............... 701/301; 701/45; 701/96; 340/436

(58) Field of Classification Search ........... 701/301, 701/45, 46, 70, 93, 96; 280/735; 180/282; 342/72, 133; 340/903, 435, 436, 438
See application file for complete search history.

(56) References Cited

U.S. PATENT DOCUMENTS

| | | | | |
|---|---|---|---|---|
| 5,748,477 A | * | 5/1998 | Katoh | 701/301 |
| 5,872,536 A | * | 2/1999 | Lyons et al. | 342/70 |
| 5,900,807 A | * | 5/1999 | Moriyama et al. | 340/436 |
| 5,936,549 A | * | 8/1999 | Tsuchiya | 340/903 |
| 5,955,967 A | * | 9/1999 | Yamada | 340/904 |
| 6,087,928 A | * | 7/2000 | Kleinberg et al. | 340/436 |
| 6,105,507 A | | 8/2000 | Jelf et al. | |
| 6,271,747 B1 | * | 8/2001 | Fendt et al. | 340/436 |
| 6,396,427 B1 | * | 5/2002 | Mattes et al. | 341/139 |
| 6,856,874 B2 | * | 2/2005 | Weilkes et al. | 701/45 |
| 6,898,498 B1 | * | 5/2005 | Wessels et al. | 701/45 |

* cited by examiner

*Primary Examiner*—Tan Q. Nguyen
(74) *Attorney, Agent, or Firm*—Frank A. MacKenzie

(57) ABSTRACT

The present invention is an automotive collision mitigation system comprising at least one sensor for sensing first and second detection zones. A controller, responsive to the at least one sensor, determines at least one countermeasure attribute for reducing occupant injury potential.

15 Claims, 4 Drawing Sheets

COLLISION MITIGATION SYSTEM

BACKGROUND OF INVENTION

The present invention relates, generally, to the field of pre-crash sensing systems for automotive vehicles and, more specifically, to automotive pre-crash sensing methods and apparatuses having countermeasure attributes associated therewith.

Auto manufacturers are investigating radar, lidar, and vision-based pre-crash sensing systems to improve occupant safety. Current vehicles typically employ accelerometers that measure decelerations acting on the vehicle body in the event of a crash. In response to the accelerometer measurements, braking, acceleration and other countermeasure systems are employed.

In certain crash situations, it would be desirable to provide information about potential collisions before forces actually act upon the vehicle in order to manipulate the operation of the vehicle and thus, reduce the impact of a collision. One example where such a system would be beneficial is a situation involving a frontal and rear impact situation occurring at relatively the same incident.

U.S. Pat. No. 6,105,507 for an amusement park ride attraction discloses a vehicle bumper system which utilizes front and rear sensors to allow a vehicle to accelerate or decelerate to simulate either a frontal or rear collision. A vehicle braking system and an acceleration system are controlled by a programmable controller for actuating the braking and accelerator systems in response to a simulated frontal or rear collision occurring in order to simulate the effects of a physical impact for amusement purposes.

While U.S. Pat. No. 6,105,507 is suitable for its intended purpose for amusement park rides, it does not address mitigating the combined magnitude of potential dual collision events. It would be desirable to provide a system that takes into consideration the combined magnitude of the collision events in a dual pre-crash situation in order to deploy associated countermeasure attributes for mitigating the effects of multiple collisions.

SUMMARY OF INVENTION

Briefly described, the present invention comprises a system, including apparatuses and methods that integrate a pre-crash sensor for sensing first and second detection zones with pre-crash sensor logic for the deployment of countermeasure attributes.

More particularly, in a first form, the present invention provides an automotive collision mitigation system. In one aspect of the present invention, at least one sensor is provided for sensing a first detection zone and a second detection zone.

A controller then determines at least one countermeasure attribute responsive to the at least one sensor.

Therefore, the present invention applies pre-crash countermeasure attributes to reduce the combined magnitude of primary and secondary potential impacts on a vehicle for the purpose of reducing the potential for occupant injury.

Other advantages of the present invention will become apparent upon reading and understanding the present specification when taken in conjunction with the appended drawings.

BRIEF DESCRIPTION OF DRAWINGS

The invention will be more readily understood from a reading of the following specifications and by reference to the accompanying drawings forming a part thereof, wherein an example of the invention is shown and wherein.

Figure 1:
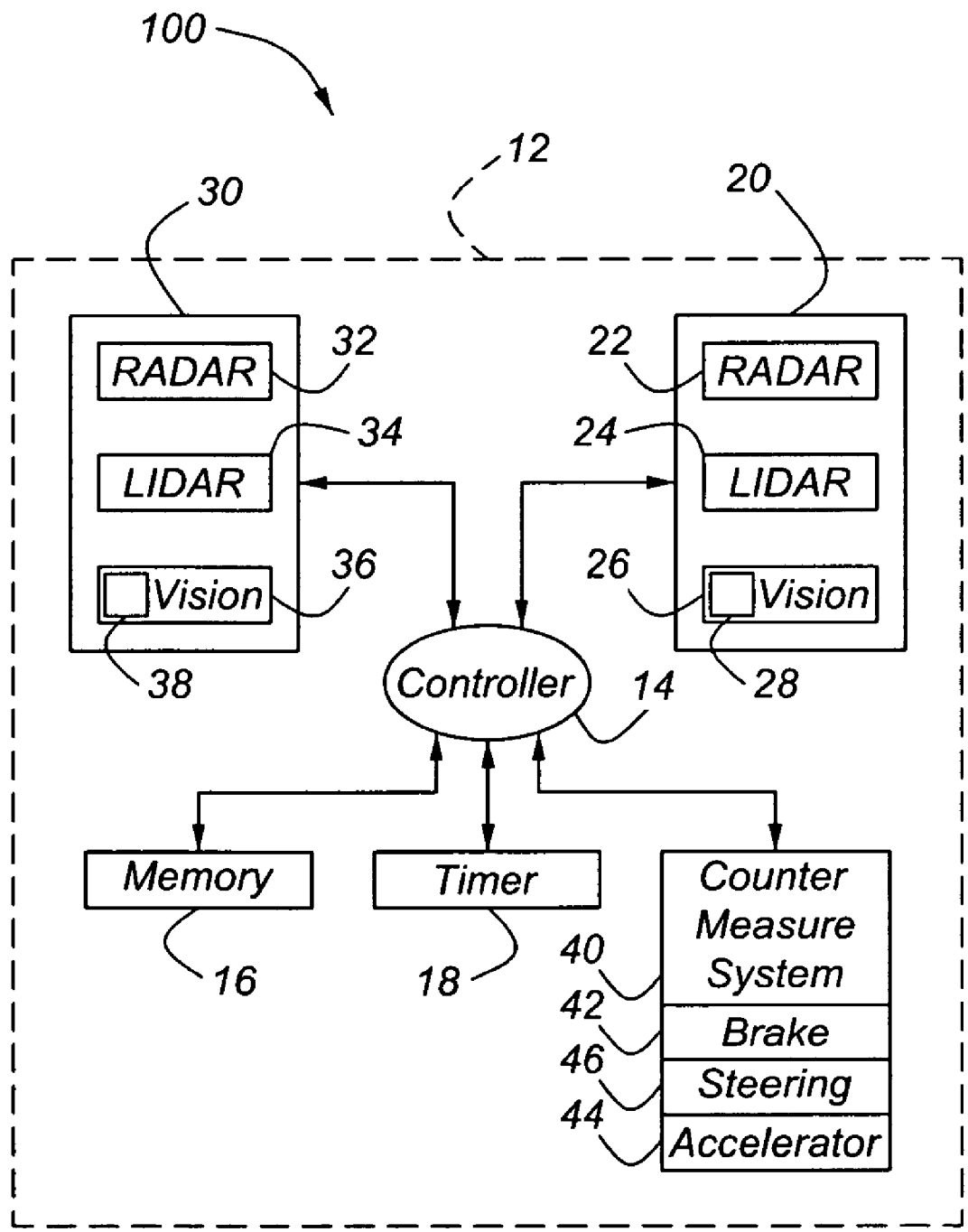
FIG. 1 displays a block diagram of an automotive collision mitigation system according to the present invention.

The construction designed to carry out the invention will hereinafter be described, together with other features thereof.

DETAILED DESCRIPTION

Referring now to the drawings in which like numerals represent similar elements or steps throughout the several views, a collision mitigation system is described herein. The collision mitigation system of the present invention comprises a controller that is electronically communicative with at least one object sensor. The controller determines an appropriate countermeasure for reducing the effects of a likely collision as a consequence of an object or objects sensed by the at least one object sensor.

Referring to FIG. 1, a collision mitigation system 100 for a host vehicle 12 has a controller 14. Controller 14 is preferably a microprocessor-based controller that is coupled to a memory 16 and a timer 18. Memory 16 and timer 18 are illustrated as separate components from that of controller 14. However, those skilled in the art will recognize that a memory 16 and timer 18 may be incorporated into controller 14.

Memory 16 may comprise various types of memory including read only memory, random access memory, electronically erasable programmable read only memory, and keep alive memory. Memory 16 is used to store various predefined thresholds and parameters as will be further described below.

Timer 18 is a timer such as a clock timer of a central processing unit within controller 14. Timer 18 is capable of timing the duration of various events as well as counting up or counting down.

The present invention comprises at least one sensor for sensing a first detection zone and a second detection zone, as described in detail below. One embodiment of the present invention comprises frontal and rear object sensors. Frontal object sensor 20 is coupled to controller 14. Frontal object sensor 20 may be comprised of one or more types of sensors including a radar 22, a lidar 24, and/or a frontal vision system 26. Frontal vision system 26 may be comprised of one or more cameras 28. The radar 22, lidar 24, and/or the one or more cameras 28 are capable of sensing the presence and the distance of an object from host vehicle 12 within a frontal detection zone, as described in detail below. Also, several radars or lidars may be used to determine the distance to an object using well-known triangulation techniques.

Rear object sensor 30 is also coupled to controller 14. Rear object sensor 30 may also be comprised of one or more sensors including radar 32, lidar 34 and/or a rear vision system 36. Rear vision system 36 may be comprised of one or more cameras 38. The radar 22, lidar 24, and/or the one or more cameras 38 are capable of sensing the presence and the distance of an object from host vehicle 12 within a rear detection zone, as described in detail below. Again, several radars or lidars may be used to determine the distance to an object using well-known triangulation techniques.

Controller 14 is communicatively connected to a countermeasure activation system 40. Countermeasure activation system 40 is capable of activating one or more countermeasure attributes such as braking 42, accelerating 44 or steering 46 systems for mitigating the effects of likely frontal, rear or dual crash situations. Controller 14 determines at least one countermeasure attribute associated with the braking 42, accelerating 44 or steering 46 systems in response to signals received from frontal and rear object sensors, 20 and 30, respectively.

Figure 2:
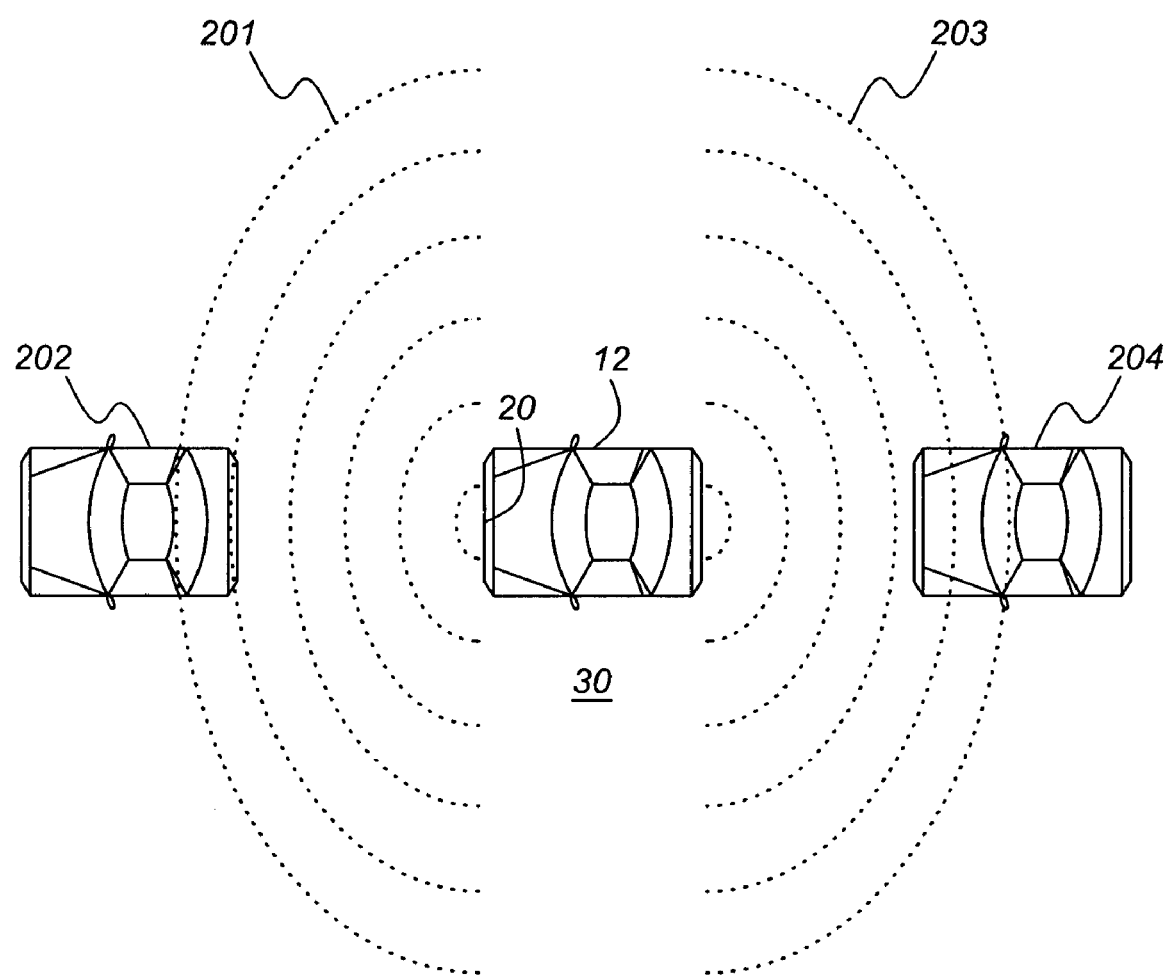
FIG. 2 displays a dual pre-crash situation response according to the present invention.

FIG. 2 displays a dual pre-crash situation response according to the present invention. Host vehicle 12 is positioned between vehicles 202 and 204 in a typical traffic situation. Frontal object sensor 20 generates an object signal when the presence of an object within a frontal detection zone 201 in front of host vehicle 12 is detected. Likewise, rear object sensor 30 generates an object signal when the presence of an object within a rear detection zone 203 in rear of host vehicle 12 is detected. Controller 14 is configured to determine the likelihood and severity of frontal and rear collisions. For the purposes of this embodiment, only frontal and rear collisions will be discussed, however, one skilled in the art will note that the present invention may be modified for mitigating various other angular collisions, including side collisions, as well.

Frontal object sensor 20 enables controller 14 to determine the likelihood and severity of a primary frontal impact. In the event that a frontal impact is deemed likely, rear object sensor 30 enables controller 14 to determine the likelihood of a secondary rear impact. Controller 14 may then determine a countermeasure attribute for reducing the combined magnitude of the primary frontal and secondary rear impacts.

Rear object sensor 30 enables controller 14 to determine the likelihood and severity of a primary rear impact. In event that a rear impact is deemed likely, frontal object sensor 20 enables controller 14 to determine the likelihood of a secondary frontal impact. Controller 14 may then determine a countermeasure attribute for reducing the combined magnitude of the primary rear and secondary frontal impacts.

Depending on the likelihood and severity of the pending frontal and/or rear impacts determined by the frontal 20 and rear 30 object sensors, controller 14 is responsive to mitigate the effects of a frontal impact, a rear impact or a combination of frontal and rear impacts. Controller 14 determines at least one countermeasure attribute for mitigating the combined magnitude of frontal and rear impacts which may include the deployment of an accelerating, steering or braking system. A countermeasure attribute may also include the deployment of an airbag restraint system, a barrier device, various other collision mitigation devices or a combination thereof.

Figure 3:
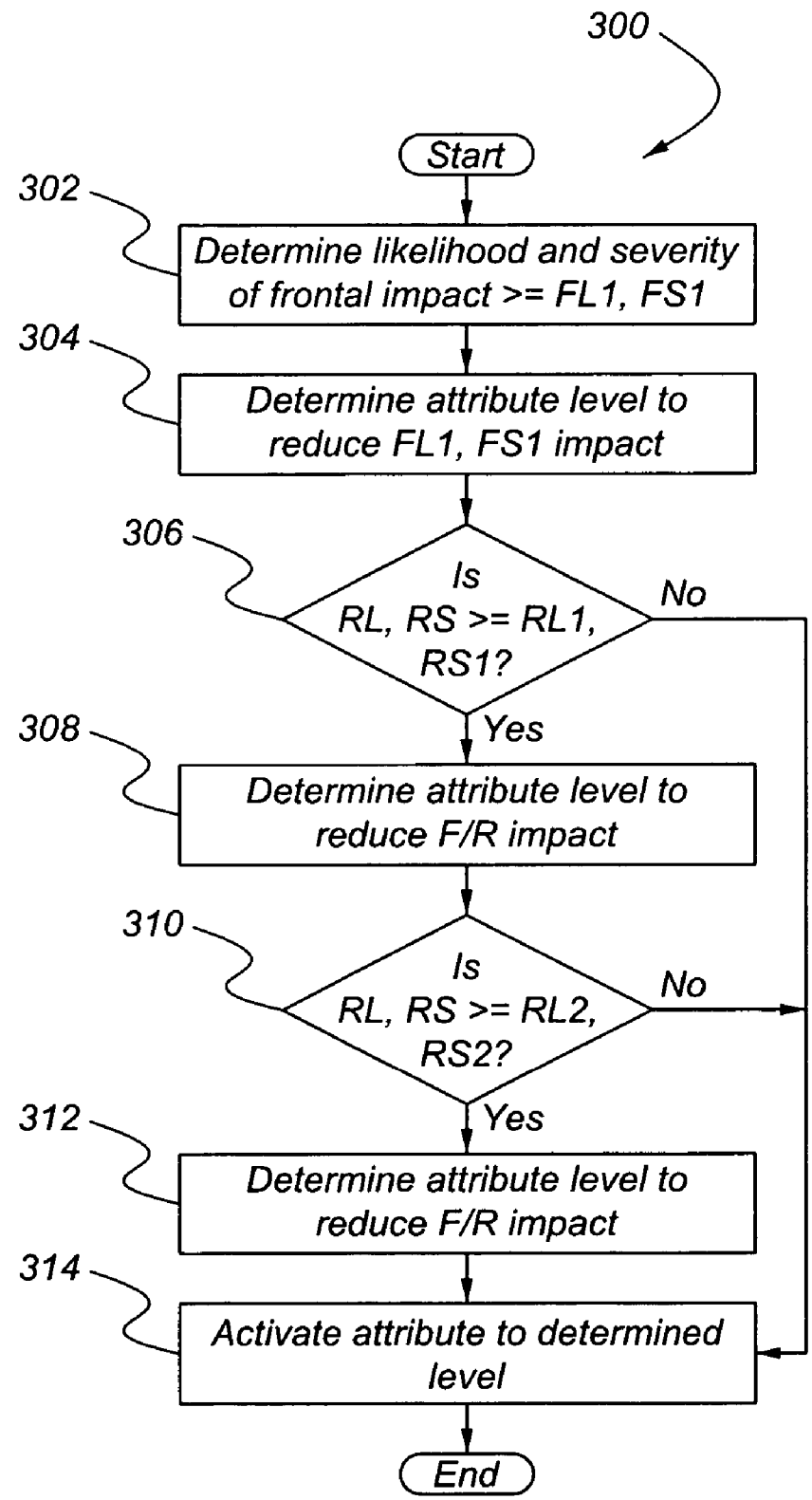
FIG. 3 displays a flowchart representation of pre-crash logic for a frontal primary impact according to the present invention.
Figure 4:
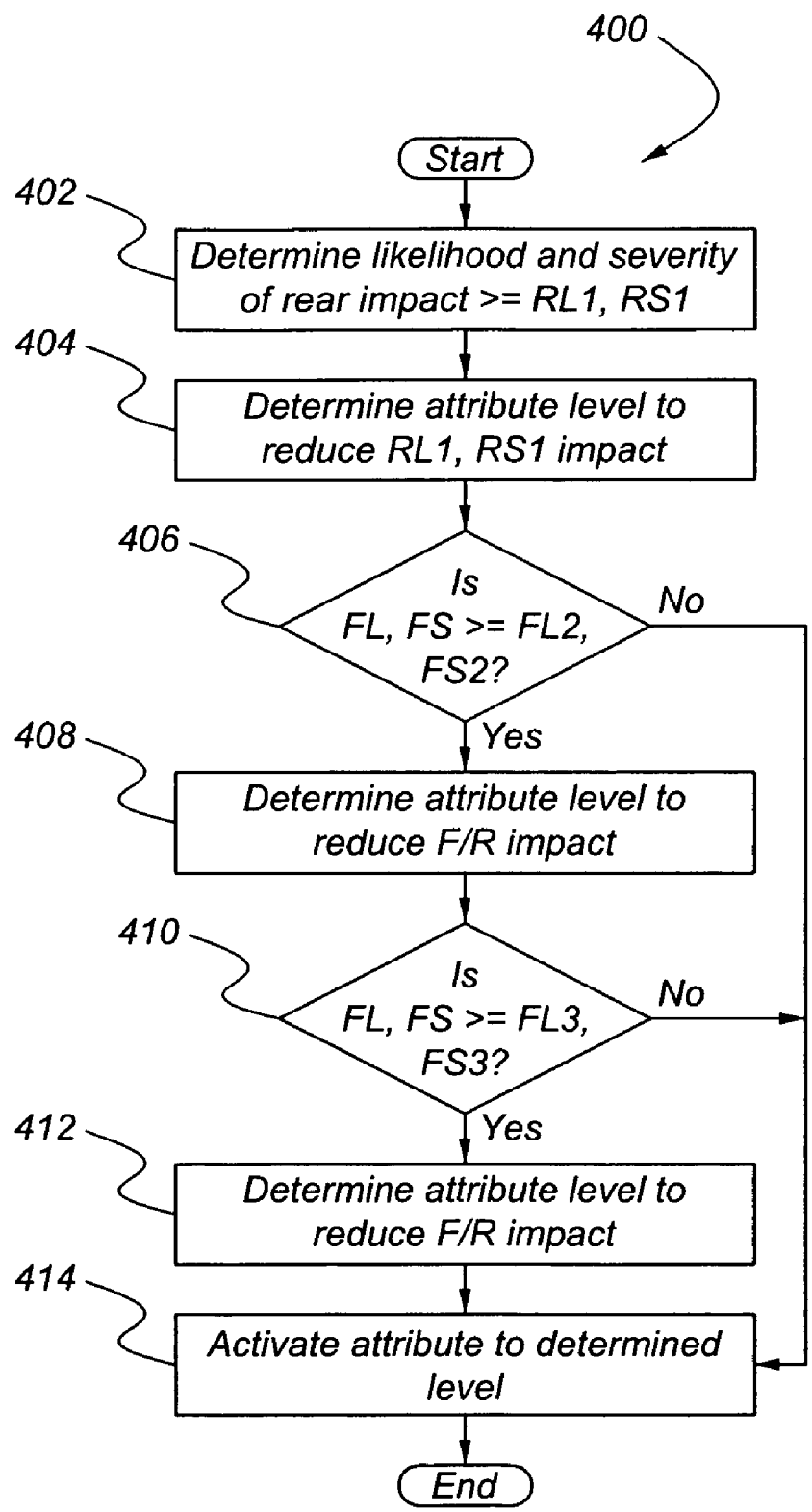
FIG. 4 displays a flowchart representation of pre-crash logic for a rear primary impact according to the present invention.

FIGS. 3 and 4 describe the controller logic for frontal and rear primary collisions, respectively. The scenarios presented in FIGS. 3 and 4 can occur interchangeably wherein a likely frontal collision can be detected before a likely rear collision or vice versa depending on the sensed conditions. Therefore, in certain instances the steps of FIG. 3 may not necessarily precede the steps of FIG. 4.

As such, FIG. 3 displays a flowchart representation of pre-crash logic when a frontal sensor is sensing the likelihood of a frontal collision 300 according to the preferred embodiments of the present invention wherein a braking system 42 is used as a countermeasure attribute. In a first scenario, a likely frontal impact is detected with no likely rear impact. After starting, controller 14 at step 302 determines if the likelihood of the detected likely frontal impact, FL, and the likely severity of the detected frontal impact, FS, are greater than or equal to predefined threshold parameters, FL1 and. FS1, respectively. Next, at step 304, controller 14 determines an appropriate brake level for reducing the detected likely frontal impact. At step 306, controller 14 determines if the likelihood of a secondary rear impact, RL, and the severity of such an impact, RS, are greater than or equal to predefined threshold parameters, RL1 and RS1, respectively. If RL and RS are not greater than RL1 and RS1, then controller 14 will determine a countermeasure attribute for activating braking system 42 to an appropriate brake level to reduce only the magnitude of the pending FL1 and FS1 frontal impact in step 314.

In a second scenario, a primary frontal impact of likelihood and severity, FL1 and FS1, is detected with a secondary rear impact of likelihood and severity, RL1 and RS1, wherein FL1, FS1, RL1 and RS1 are predetermined threshold parameters. After starting, controller 14 at step 302 determines if the likelihood of a primary frontal impact, FL, and the likely severity of such an impact, FS, are greater than or equal to predefined threshold parameters, FL1 and FS1, respectively. Next, at step 304, controller 14 determines an appropriate brake level to reduce the detected likely frontal impact. At step 306, controller 14 determines whether the likelihood of a secondary rear impact, RL, and the likely severity of such an impact, RS, are greater than or equal to predefined threshold parameters, RL1 and RS1, respectively. If RL and RS are greater than or equal to RL1 and RS1, then controller 14 determines an appropriate brake level to reduce the pending frontal and rear impacts at step 308. Continuing at step 310, controller 14 determines if the likelihood of the secondary rear impact, RL, and the likely severity of such an impact, RS, are greater than or equal to RL2 and RS2, wherein RL2 and RS2 are predetermined threshold parameters of greater magnitude than the RL1 and RS1 threshold parameters described above. If RL and RS are not greater RL2 and RS2, then controller 14 will determine a countermeasure attribute for activating braking system 42 to reduce the combined magnitude of the pending frontal impact and pending RL1 and RS1 magnitude rear impact in step 314.

In a third scenario, a primary frontal impact of likelihood and severity, FL1 and FS1, is detected with a secondary rear impact of likelihood and severity, RL2 and RS2, wherein RL2 and RS2 are predetermined threshold parameters of greater magnitude than the RL1 and RS1 threshold parameters described above. After starting, controller 14 at step 302 determines if the likelihood of a primary frontal impact, FL, and the likely severity of such an impact, RS, is greater than or equal to predefined threshold parameters, FL1 and FS1, respectively. Next, at step 304, controller 14 determines an appropriate brake level to reduce the pending frontal impact. At step 306, controller 14 determines whether the likelihood of a secondary rear impact, RL, and the likely severity of such an impact, RS, are greater than or equal to predefined threshold parameters, RL1 and RS1, respectively. If so, then controller 14 will determine an appropriate brake level in step 308. Continuing at step 310, if controller 14 determines that RL and RS are greater than or equal to predefined threshold parameters RL2 and RS2, then controller 14 will determine an appropriate brake level to reduce an RL2 and RS2 magnitude rear impact at step 312. Controller 14 will determine a countermeasure attribute for activating braking system 42 to reduce the combined magnitude of the pending frontal impact and pending RL2 and RS2 magnitude rear impact in step 314. If controller 14 determines that RL and RS are not greater than RL2 and RS2, then controller 14 will determine a countermeasure attribute for activating braking system 42 to reduce the combined magnitude of the pending frontal impact and the pending RL1 and RS1 magnitude rear impact in step 314, as described above.

FIG. 4 displays a flowchart representation of pre-crash logic for a primary rear collision 400 according to embodiments of the invention of FIG. 1. In a first scenario, a primary rear impact is detected with no secondary frontal impact. After starting, controller 14 at step 402 determines if the likelihood of a primary rear impact, RL, and the severity of such an impact, RS, are greater than or equal to predefined threshold parameters, RL1 and RS1, respectively. Next, at step 404, controller 14 determines an appropriate throttle level and brake level to reduce the pending rear impact. At step 406, controller 14 determines if the likelihood of a secondary frontal impact, FL, and the likely severity of such an impact, FS, are greater than or equal to predefined threshold parameters, FL2 and FS2, respectively. If FL and FS are not greater than FL2 and FS2, then controller 14 will determine a countermeasure attribute for activating braking system 42 and accelerating system 44 to reduce only the magnitude of the pending RL1 and RS1 magnitude rear impact in step 414.

In a second scenario, a primary rear impact of likelihood and severity, RL1 and RS1, is detected with a secondary frontal impact of likelihood and severity, FL2 and FS2, wherein FL2, FS2, RL1 and RS1 are predetermined threshold parameters. After starting, controller 14 at step 402 determines if the likelihood of a primary rear impact, RL, and the likely severity of such an impact, RS, are greater than or equal to predefined threshold parameters, RL1 and RS1, respectively. Next, at step 404, controller 14 determines an appropriate throttle level and brake level to reduce the pending RL1 and RS1 magnitude rear impact. At step 406, controller 14 determines if FL and FS are greater than or equal to predefined threshold parameters, FL2 and FS2, respectively. If FL and FS are greater than or equal to FL2 and FS2, then controller 14 determines an appropriate throttle level and brake level to reduce the combined magnitude of the pending FL2 and FS2 magnitude frontal impact and pending rear impact at step 408. Continuing at step 410, controller 14 determines if FL and FS are greater than or equal to predetermined parameters FL3 and FS3, which are greater in magnitude than FL2 and FS2, respectively. If FL and FS are not greater than or equal to FL3 and FS3, controller 14 will determine a countermeasure attribute for activating braking system 42 and accelerating system 44 to reduce the combined magnitude of the pending rear impact and the pending FL2 and FS2 magnitude frontal impact in step 414.

In a third scenario, a primary rear impact of likelihood and severity, RL1 and RS1, is detected with a secondary frontal impact of likelihood and severity, FL3 and FS3, wherein FL3 and FS3 are predetermined threshold parameters greater in magnitude than FL2 and FS2. After starting, controller 14 at step 402 determines that the likelihood of a primary rear impact, RL, and the likely severity of such an impact, RS, are greater than or equal to predefined threshold parameters, RL1 and RS1, respectively. Next, at step 404, controller 14 determines an appropriate throttle level and brake level to reduce the pending RL1 and RS1 magnitude rear impact. At step 406, controller 14 determines whether the likelihood of a secondary frontal impact, FL, and the likely severity of such an impact, FS, are greater than or equal to predefined threshold parameters, FL2 and FS2, respectively. If FL and FS are greater than or equal to FL2 and FS2, then controller 14 will determine an appropriate throttle level and brake level to reduce the combined magnitude of the pending frontal impact and pending rear impact at step 408. Continuing at step 410, if controller 14 determines that FL and FS are greater than or equal to predefined threshold parameters FL3 and FS3, then controller 14 will determine an appropriate throttle level and brake level to reduce the combined magnitude of the pending rear impact and an FL3 and FS3 magnitude frontal impact at step 412. Controller 14 will determine a countermeasure attribute for activating braking system 42 and accelerating system 44 to reduce the combined magnitude of the pending rear impact and FL3 and FS3 magnitude frontal impact in step 414. If controller 14 determines that FL and FS are not greater than FL3 and FS3, then controller 14 will determine a countermeasure attribute for activating braking system 42 and accelerating system 44 to reduce the combined magnitude of the pending rear impact and an FL2 and FS2 magnitude frontal impact in step 414.

The present invention has been described in relation to particular embodiments, which are intended in all respects to be illustrative rather than restrictive. Alternate embodiments will become apparent to those skilled in the art to which the present invention pertains without departing from its spirit and scope. Accordingly, the scope of the present invention is described by the appended claims and supported by the foregoing description.

The invention claimed is:

1. An automotive collision mitigation system, comprising:
    at least one sensor for sensing a first detection zone and a second detection zone, and
    a controller for predicting a primary severity of a primary impact sensed in said first detection zone, and a secondary severity of a secondary impact sensed in said second detection zone, and at least one countermeasure attribute responsive to said at least one sensor, said countermeasure attribute reducing the combined severity of said primary impact and said secondary impact.

2. The system of claim 1, wherein said at least one sensor senses a parameter for determining the likelihood and severity of a collision in a frontal detection zone.

3. The system of claim 2, wherein said at least one sensor senses a parameter for determining the likelihood and severity of a collision in a rear detection zone.

4. The system of claim 3, wherein said controller determines a first countermeasure attribute responsive to when said at least one sensor senses a parameter for determining the likelihood and severity of a frontal collision only.

5. The system of claim 4, wherein said controller determines said first countermeasure attribute responsive to the magnitude of said parameter for determining the likelihood and severity of said frontal collision.

6. The system of claim 5, wherein said magnitude of said parameter for determining the likelihood and severity of said frontal collision varies between a predetermined range.

7. The system of claim 3, wherein said controller determines a second countermeasure attribute responsive to when said at least one sensor senses a parameter for determining the likelihood and severity of a rear collision only.

8. The system of claim 7, wherein said controller determines said second countermeasure attribute responsive to the magnitude of said parameter for determining the likelihood and severity of said rear collision.

9. The system of claim 8, wherein said magnitude of said parameter for determining the likelihood and severity of said rear collision varies between a predetermined range.

10. The system of claim 3, wherein said controller determines a third countermeasure attribute responsive to when said at least one sensor senses a parameter for determining the likelihood and severity of a frontal collision and a rear collision.

11. The system of claim 10, wherein said controller determines said third countermeasure attribute responsive to the magnitude of said parameter for determining the likelihood and severity of said frontal collision and said rear collision.

12. The system of claim 11, wherein said magnitude of said parameter for determining the likelihood and severity of said frontal collision and said rear collision varies between a predetermined range.

13. An automotive collision mitigation system, comprising:
   at least one sensor for sensing a first detection zone and a second detection zone;
   a controller for predicting a primary severity of a primary impact sensed in said first detection zone, and a secondary severity of a secondary impact sensed in said second detection zone, and at least one countermeasure attribute responsive to said at least one sensor, said countermeasure attribute reducing the combined severity of said primary impact and said secondary impact; and
   said at least one countermeasure attribute for determining the activation of at least one of an accelerating, steering or braking system.

14. The system of claim 13, wherein said at least one countermeasure attribute includes a parameter for activating at least one of said accelerating, steering or braking systems.

15. A method for automotive collision mitigation, comprising the steps of:
   sensing a first detection zone and a second detection zone utilizing at least one sensor; and
   predicting a primary severity of a primary impact sensed in said first detection zone, and a secondary severity of a secondary impact sensed in said second detection zone, and at least one countermeasure attribute responsive to said at least one sensor, said countermeasure attribute reducing the combined severity of said primary impact and said secondary impact.

* * * * *